United States Patent
Luneburg et al.

(10) Patent No.: US 7,364,420 B2
(45) Date of Patent: Apr. 29, 2008

(54) ROTARY PRESS FOR MAKING TABLETS

(75) Inventors: Peter Luneburg, Berkentin (DE); Ingo Schmidt, Schwarzenbek (DE); Joachim Greve, Pogeez (DE); Ulrich Arndt, Lauenburg (DE); Alexander Oldenburg, Dassendorf (DE)

(73) Assignee: Fette GmbH, Schwarzenbek (DE)

( * ) Notice: Subject to any disclaimer, the term of this patent is extended or adjusted under 35 U.S.C. 154(b) by 319 days.

(21) Appl. No.: 11/203,888

(22) Filed: Aug. 15, 2005

(65) Prior Publication Data
US 2006/0040011 A1 Feb. 23, 2006

(30) Foreign Application Priority Data
Aug. 19, 2004 (DE) .................. 10 2004 040 163

(51) Int. Cl.
*B29C 43/08* (2006.01)
(52) U.S. Cl. .................. 425/345; 425/353; 100/102; 310/254; 310/261
(58) Field of Classification Search .......... 425/182, 425/193, 345, 353, 361; 100/102; 310/254, 310/261
See application file for complete search history.

(56) References Cited
U.S. PATENT DOCUMENTS 4,612,468 A * 9/1986 Sturm et al. .................. 310/42
4,973,872 A * 11/1990 Dohogne .................. 310/43
6,116,889 A * 9/2000 Pagel et al. .................. 425/345
6,624,543 B1 * 9/2003 Bankstahl .................. 310/91
6,997,691 B2 * 2/2006 Trebbi et al. .................. 425/345
7,229,267 B2 * 6/2007 Meier .................. 425/353

FOREIGN PATENT DOCUMENTS

DE 197 05 094 C1 7/1998
DE 101 59 114 A1 6/2003
DE 103 26 175 B3 2/2005

OTHER PUBLICATIONS

Patent Abstracts of JP 11267896 A, "Rotary Type Powder Molding Machine", U.S. Appl. No. 10/089,417.

* cited by examiner

*Primary Examiner*—James P. Mackey
*Assistant Examiner*—Thu Khanh T. Nguyen
(74) *Attorney, Agent, or Firm*—Vidas, Arrett, and Steinkraus P.A.

(57) ABSTRACT

Rotary press for making tablets with a rotor, which rotor exhibits a die plate and guides for the upper and lower punches, a rotor shaft and an electric drive motor, which electric drive motor rotates the rotor shaft and exhibits a runner and a stator, wherein the runner is disposed directly on the rotor shaft in a torque proof manner or is coupled coaxially with the rotor shaft in a torque proof manner

4 Claims, 3 Drawing Sheets

ROTARY PRESS FOR MAKING TABLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The main component of a rotary press for making tablets is the rotor or the rotor package. The rotor consists of a die plate and guides for the upper and lower punches. In known presses, these parts are mostly manufactured in one piece. Further vital components are cam segments which control the position of the upper and lower punches in the guides, and at least one upper and one lower pressure roller in the press station in which the pressure roller press upper and lower punches against each other in order to compress the material to be compressed in the dies of the die plate. In known rotary presses for making tablets, the rotor is connected to a central, upright rotor shaft which is supported for rotation in the machine casing. The rotor shaft is driven by an electric drive motor which is placed in the machine casing and which is coupled, by a belt drive or something similar, to a reduction gear the output shaft of which is coupled to the rotor shaft.

BRIEF SUMMARY OF THE INVENTION

In conventional rotary presses for making tablets, the rotor is seated on the upper end of the rotor shaft in a torque proof manner, wherein the rotor shaft and the rotor are borne with the help of antifriction bearings in the machine frame. The bearing of the cam segments and the pressure rollers is done in the frame as well.

The drive mechanism for the rotary press for making tablets described exhibits a plurality of individual parts, such as rotor shaft, gear means, motor, belt transmission, etc., which are in part subject to wear, need to be maintained frequently, and are difficult to assemble. Moreover, they require a relatively large amount of space.

The problem underlying the invention is to improve a rotary press for making tablets such that it gets a more compact structural design with less individual or wearable parts, respectively.

The rotary press for making tablets of the invention has an electric motor the runner of which is disposed directly on the press rotor in a torque proof manner or is coupled to it coaxially in a torque proof manner. In the above and hereafter, the term rotor is used only for the part of the rotary press for making tablets defined above, while for the electric motor, the terms runner and stator will be used.

In an embodiment of the invention, the runner of the electric motor can be flanged to the end of the rotor shaft. The bearing of rotor and rotor shaft can be accomplished conventionally in the machine frame.

In an alternative embodiment of the invention, the runner is disposed on the rotor shaft directly below the rotor or in a small spacing thereof.

The runner of the electric motor is integrated in the rotor of the press for making tablets and surrounds the stator which is disposed stationary in the frame. While in the embodiments described above a very compact structural design is achieved already, with the last-mentioned embodiment, an even better result is achieved.

For the bearing of rotor and electric drive, a further aspect of the invention provides that the stator of the motor is disposed on a stationary, vertical supporting post on which the rotor is supported rotatably, for example by means of an upper and a lower antifriction bearing, wherein the stator is placed between the antifriction bearings.

With the invention, a very compact type of construction with few individual parts and wear parts is achieved. With the construction according to the invention, an economy of space is obtained in the drive area, especially with an omission of the rotor shaft. Furthermore, the invention enables less maintenance and decreases wear in relation to the conventional drives with transmission and belt drive. Moreover, a better running smoothness is achieved and a reduction of the machine weight. A decisive time and cost reduction in manufacture and assembly of the rotary press for making tablets results because a substantially lower number of parts is necessary.

As electric motors so-called torque motors can be used. They are known as such in the context of machine tools. They have low mass inertia, high precision, high capacitance, low ripple of torque, and high efficiency and they are maintenance-free.

BRIEF DESCRIPTION OF THE SEVERAL VIEWS OF THE DRAWINGS

In the following, embodiments of the invention are exemplified in detail on the basis of drawings.

DETAILED DESCRIPTION OF THE INVENTION

Figure 1:
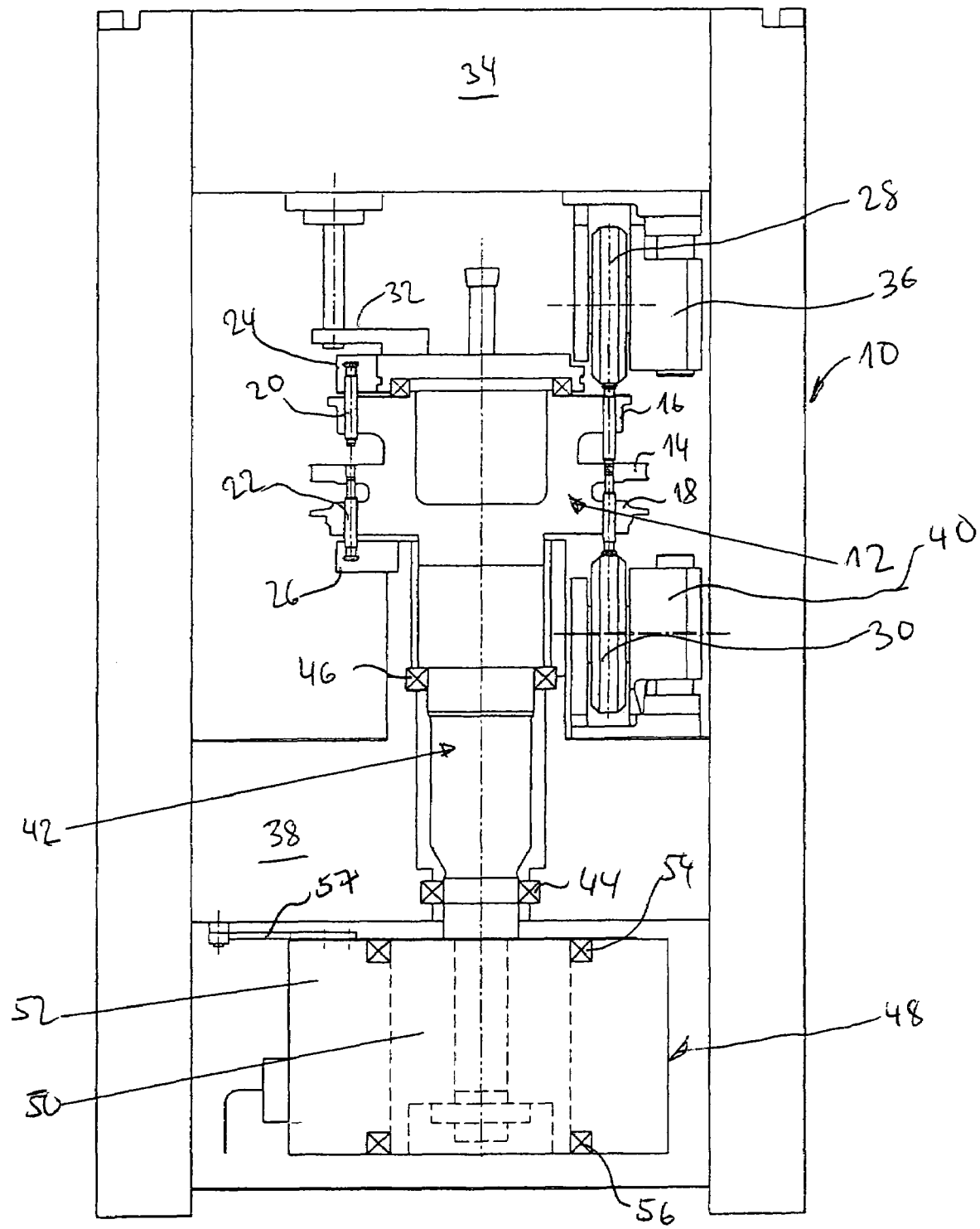
FIG. 1 schematically shows a section through a rotary press for making tablets with a drive mechanism according to the invention.

While this invention may be embodied in many different forms, there are described in detail herein a specific preferred embodiment of the invention. This description is an exemplification of the principles of the invention and is not intended to limit the invention to the particular embodiment illustrated FIG. 1 a machine frame is labeled with 10. It is used to carry a rotary press for making tablets. The latter exhibits a rotor 12, which, as usual, consists of a die plate 14, upper guide 16 for punches and lower guide 18 for punches. The named parts form a unit. The guides 16, 18 take upper punches 20 or lower punches 22, respectively, and guide these axially. They work together with non-labeled dies of die plate 14. The control of the upper and the lower punches 20, 22 is carried out by cam segments 24 or 26, respectively. Furthermore, an upper pressure roller 28 and a lower pressure roller 30 can be seen which are used to compress the powder material in the die by pressing upper and lower punches 20, 22 towards each other. As can be seen, the upper cam segments 24 are carried by an upper traverse 34 of frame 10 by means of respective retaining means 32. A bearing part 36 for the upper pressure roller 28 is also mounted to the traverse 34. The lower cam segments 26 are mounted in a lower traverse 38 of frame 10, to which traverse also a retaining portion 40 for the lower pressure roller 30 is fixed. The lower traverse 38 also bears the rotor shaft 42, namely by a lower antifriction bearing 44 and an upper antifriction bearing 46. The rotor shaft 42 is coupled with the rotor 12 in a suitable way not shown.

An electric drive motor 48, for instance a so-called torque motor, is fixed to the rotor shaft 42 below the traverse 38. Its runner 50 is placed on a lower, dashed segment of rotor shaft 42 in a torque proof manner. The runner 50 rotates in the stator 52 by means of an upper antifriction bearing 54 and a lower antifriction bearing 56. The torque at stator 52 is absorbed by means of a torque plate 57.

Figure 2:
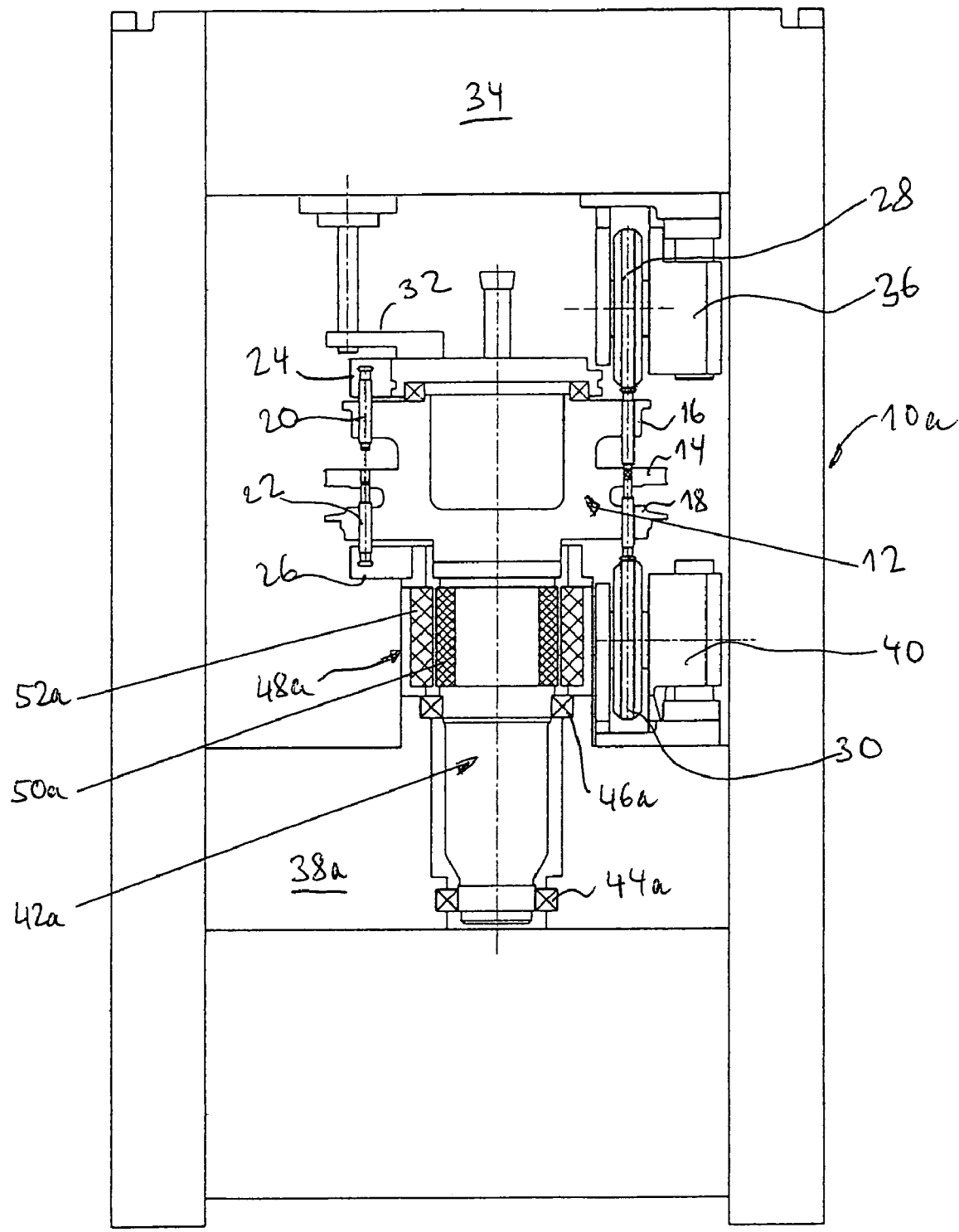
FIG. 2 shows a rotary press for making tablets with another embodiment of a drive mechanism.

As far as the same parts are taken in the embodiment according to FIG. 2 as in the embodiment according to FIG. 1, the same labels are used. The embodiment according to FIG. 2 is distinguished from that according to FIG. 1 in that the rotor shaft 42a is significantly shorter and below the rotor shaft 42a, a free space remains in frame 10a. The electric drive motor 48a is placed immediately below the rotor 12, and the runner 50a seats on a section of the rotor shaft 42a with reduced diameter. One sees that in this embodiment the achievable saving of space is considerable. The remainder of the parts of the embodiment according to FIG. 2 are composed and mounted similarly as it has been described in connection with FIG. 1.

In the embodiment according to FIG. 3, again the same parts are labeled with the same labels as in the embodiments according to FIGS. 1 and 2.

Figure 3:
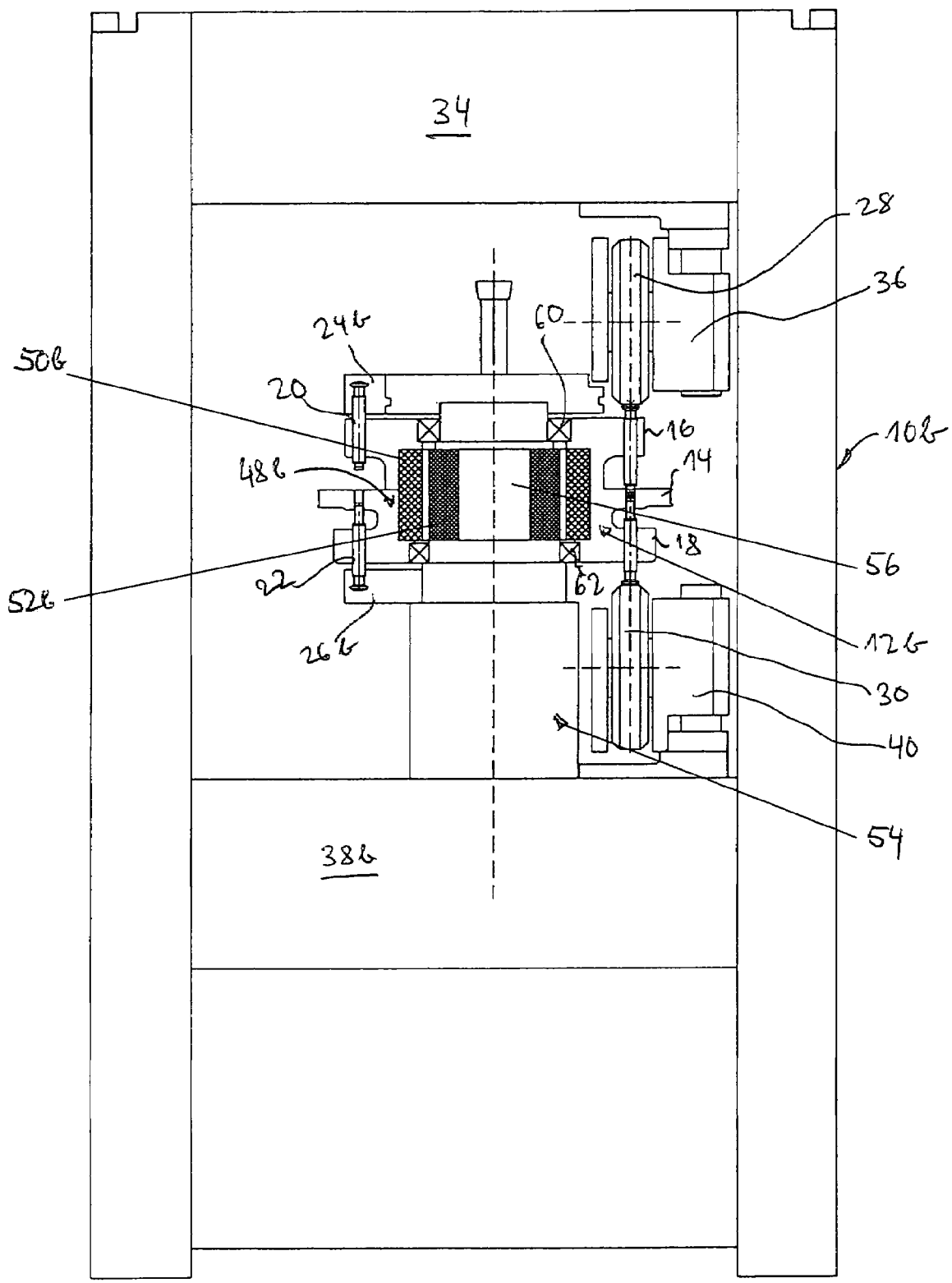
FIG. 3 shows a rotary press for making tablets with a third embodiment of a drive mechanism.

The embodiment according to FIG. 3 is distinguished from those according to FIGS. 1 and 2 in that on the traverse 38b of the frame 10b, a vertical supporting post is disposed in a stationary manner. The post exhibits a section with reduced diameter at an upper end which is labeled with 56, and it is disposed on the stator 52b of an electric drive motor 48b in a stationary manner, while its runner 50b is integrated in the rotor 12b. For mounting of the runner 50b, the rotor 12b can be divided in a horizontal plane or, alternatively, it can be composed of two or more segments in circumferential direction, which are combinable fittingly and firmly, but detachably. The rotor 12b is supported rotatably on the supporting post 54 by means of an upper antifriction bearing 60 and a lower antifriction bearing 62. As can be seen, the upper cam segments 24b are also fixed to the upper end of the supporting post 54. The lower pressure roller 30 is, on the one hand, supported in the bearing element 40, which is mounted on the traverse 38b, and on the other hand it is supported at the supporting post 54.

In the embodiment according to FIG. 3, one can see the large economy of space which is achieved in this construction.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotary press for making tablets, the rotary press comprising:
    a press rotor, the press rotor comprising a die plate and guides for upper and lower punches of the rotary press; and
    an electric drive motor, wherein the electric drive motor rotates the press rotor, the electric drive motor comprising a runner and a stator, wherein the runner is integrated in the press rotor and surrounds the stator.

2. The rotary press for making tablets according to claim 1, characterized in that the stator seats on a stationary, vertical supporting post on which the rotor is supported for rotation.

3. The rotary press for making tablets according to claim 2, characterized in that the rotor is rotatably supported at the supporting post by means of an upper and a lower antifriction bearing and the stator is disposed between the antifriction bearings.

4. The rotary press for making tablets according to claim 2, characterized in that the cam segments are mounted at the supporting post.

* * * * *